United States Patent [19]

Sano et al.

[11] Patent Number: 4,545,565
[45] Date of Patent: Oct. 8, 1985

[54] DIAPHRAGM VALVE

[75] Inventors: Nichiro Sano; Kazuhiko Tsuno, both of Nobeoka, Japan

[73] Assignee: Asahi Yukizai Kogyo Co., Ltd., Japan

[21] Appl. No.: 622,739

[22] Filed: Jun. 20, 1984

[30] Foreign Application Priority Data

Dec. 8, 1983 [JP] Japan ............... 58-188583[U]

[51] Int. Cl.⁴ .................... F16K 7/16; F16L 17/06
[52] U.S. Cl. .................................. 251/331; 285/336
[58] Field of Search ..................... 285/336; 251/331

[56] References Cited

U.S. PATENT DOCUMENTS 2,780,483  2/1957  Kessler ..................... 285/336 X
2,789,844  4/1957  Kessler ..................... 285/336
3,989,285  11/1976 Yancey ..................... 285/336
4,159,132  6/1979  Hitz ........................ 285/336 X Primary Examiner—Arnold Rosenthal
Attorney, Agent, or Firm—Burns, Doane, Swecker & Mathis

[57] ABSTRACT

A diaphragm valve suitable for the food industry, including a valve body (1) and body caps (2) connected to opposite ends thereof in a detachable but water-tight manner. Sealing between the valve body (1) and the body cap (2) is provided by an annular groove (16) recessed on the end surface of the valve body (1) and/or the body caps (2) and packing rings (17) having an inner diameter corresponding to that of the valve body (1) and provided with an annular protrusion (18) fitted to the groove (16). By this sealing, a gap between the opposite surfaces of the valve body (1) and the body cap (2) is completely eliminated.

4 Claims, 6 Drawing Figures

DIAPHRAGM VALVE

BACKGROUND OF THE INVENTION

1. Field of the Invention

The present invention relates to a diaphragm valve made of plastic and suitably utilized in the food industry for controlling transportation of a liquid.

2. Description of the Prior Art

A diaphragm valve comprising a valve body provided on each side thereof with a body cap by means of a cap nut threadedly engaged thereto is well known in the art. This type of the disphragm valve usually has a sealing means between the valve body and the body caps consisting of an annular groove recessed on the end surface of the body or the caps and an O-ring engaged in the groove. Such a valve has the drawback that a small amount of liquid transported through the valve tends to remain in the gap between the annular groove and the O-ring or between the opposed end surfaces of the body and the caps. This remaining liquid may freeze and expand in the winter, causing loose sealing. The remaining liquid causes a further serious problem when the valve is applied in the food industry because it may putrefy by bacteria and contaminate the entire system. When the transported liquid is purified water, it may degrade the purity of the water.

SUMMARY OF THE INVENTION

It is an object of the present invention to provide a diaphragm valve free from the above drawbacks of the prior art.

It is another object of the present invention to provide a diaphragm valve made of plastic, which has no gap in sealing between the valve body and body caps and thereby is not liable to liquid remaining therein.

The above objects of the present invention are achievable by a diaphragm valve including a valve body provided with a body cap at each end thereof, the body caps being connectable to an upstream piping or a downstream piping, and a diaphragm capable of controlling a rate of liquid flow to be transported through the valve, water-tight sealing between the valve body and the body caps being provided by means of packing rings accommodated in an annular groove or grooves recessed on the opposed end surface of the valve body and/or the body caps, characterized in that the packing rings have the same inner diameter as that of the valve body and are provided with an annular protrusion or protrusions to be accommodated into the entire length of the annular groove.

BRIEF DESCRIPTION OF THE DRAWINGS

Other features and advantages of the present invention will be apparent from the description with reference to the attached drawings in which.

DESCRIPTION OF THE PREFERRED EMBODIMENTS

At first, the prior art will be described in more detail with reference to FIGS. 1 and 1A for better understanding of the present invention.

Figure 1:
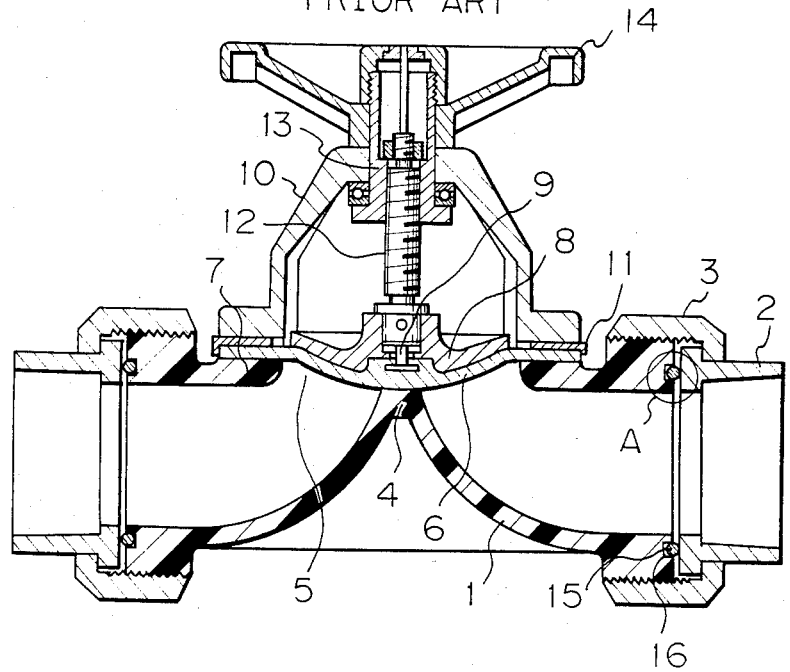
FIG. 1 is a sectional side view of a diaphragm valve of the prior art.
Figure 1A:
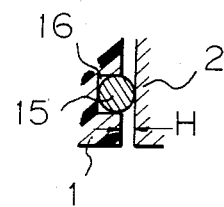
FIG. 1A is an enlarged view of sealing in a circle A shown in FIG. 1.

A typical conventional diaphragm valve, as shown in FIG. 1, includes a valve body 1 and two body caps 2, 2. The valve body 1 is essentially a hollow tube made of plastic such as polyvinyl chloride. The body caps 2 are tightly secured to ends of the valve body 1 by means of cap nuts 3, which are threadedly engageable with an outer surface of the valve body 1. The valve can be incorporated in a pipeline (not shown) in a known manner. The valve body 1 can solely be removed therefrom by disengagement of the cap nuts 3 from the valve body 1, if necessary.

Part of an inside wall of the valve body 1 projects inward at a midportion thereof and forms a shutter wall 4. An opening 5 is provided on a side wall of the valve body 1 confronting the shutter wall 4. A diaphragm 6 made of a resilient material such as synthetic rubber or plastic is mounted on a flange 7 provided around the opening 5 so as to seal the opening 5 in a manner described later. Thus, the shutter wall 4 and the diaphragm 6 are positioned to confront each other.

A presser 8 is secured on the midportion of the diaphragm 6 through a metal member 9 embedded therein. The presser 8 is made of a rigid material such as metal or hard plastic and has a function to deform the diaphragm 6 so as to bring it into contact with the shutter wall 4 when stopping of the liquid flow is required.

Further, a bonnet 10 rests on the diaphragm 9 at the outerside of the presser 8 through a metal liner 11 and is secured on the valve body 1 by means of screw-nut means (not shown), whereby the diaphragm 6 is fixedly nipped between the bonnet 10 and the flange 7.

A spindle 12 is coaxially fixed at the lower end thereof to the presser 8 and further is supported at the middle portion by a sleeve 13 threadedly engaged with the spindle 12. On the other hand, the sleeve 13 is coaxially mounted on the bonnet 10 so as to be slidable both in the rotational and the axial directions relative to the bonnet 10.

A handle 14 is fixed to the sleeve 13 for rotation thereof.

According to the above-mentioned constructions, rotation of the handle 14 causes the sleeve 13 to revolve and, in turn, the spindle 12 threadedly engaged thereto is displaced in the axial direction.

Each body cap 2 has a stepped channel, comprising a first channel at a side to be adjacent to the valve body 1 having the same diameter "d" as that of the valve body 1 and a second channel at the other side further from the valve body 1 having a larger diameter than the former.

The sealing between the valve body 1 and each of the body caps 2 is attained by an O-ring 15 located in an annular groove 16 recessed on the end surface of the valve body 1 to be adjacent to the body caps 2. As apparent from FIG. 1A, a gap H is inherently formed between the opposed surfaces of the valve body 1 and the body caps 2, in which part of the liquid is trapped and causes the trouble described before.

Figure 2:
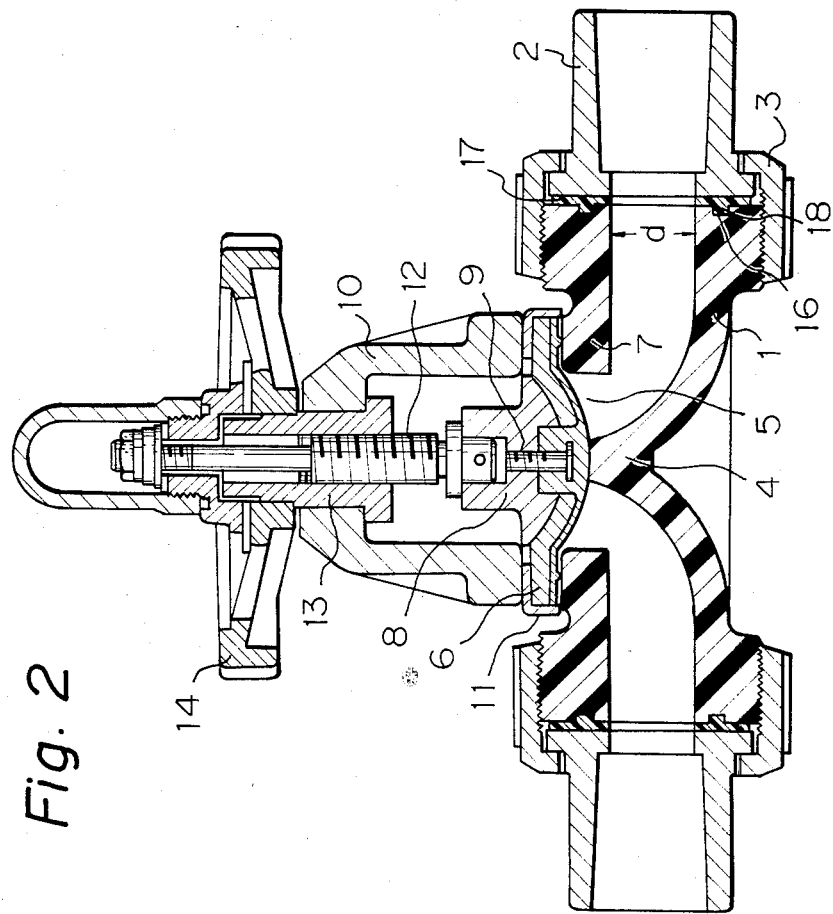
FIG. 2 is a similar view as FIG. 1 of one embodiment of the present invention.

To solve this problem, a diaphragm valve according to the present invention is proposed as shown in FIG. 2. This valve has essentially the same construction as the one illustrated in FIG. 1 except for the sealing between the valve body and the body caps and, therefore, the same reference numerals are utilized for designating similar or identical parts of the two.

Instead of the O-ring 15 utilized in the conventional valve, there is adopted a packing ring 17 which has an inner diameter "d" the same as those of the channel of the valve body 1 and of the first channel of the body caps 2 and also has an annular protrusion 18 adapted to be tightly accommodated in the entire length of annular groove 16. The packing ring 17 may be made of any resilient material, but preferably is an elastomer. A height of the protrusion 18 from a base surface 21 of the packing ring 17 is preferably somewhat larger than the depth of the groove 16, such as from 0.2 mm to 0.3 mm.

Figure 3:
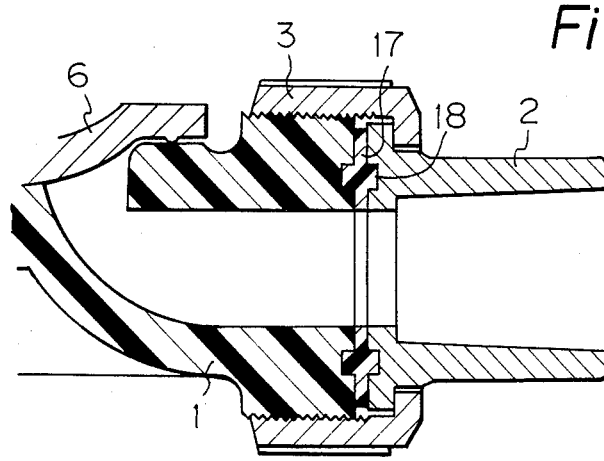
FIGS. 3 and 4 are enlarged side sectional views showing two different types of sealing according to the present invention.
Figure 4:
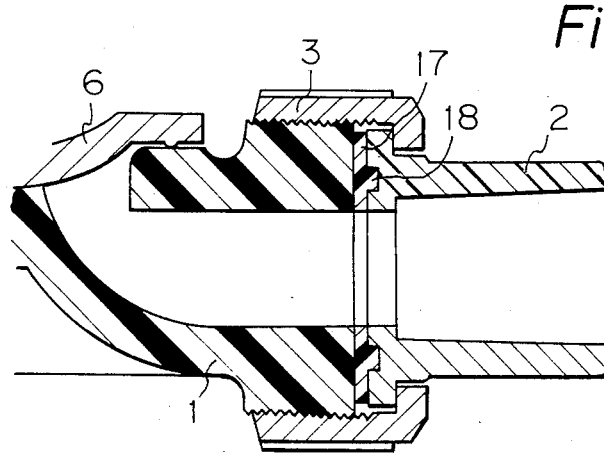
Figure 5:
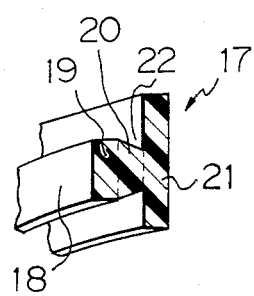
FIG. 5 is a perspective view of part of a preferable packing ring according to the present invention.

The annular groove 16 may be provided on the end surface of the body caps 2 instead of or in addition to the end surface of the valve body 1 as shown in FIG. 3 or 4. In such cases, of course, the packing ring 17 should have a protrusion or protrusions having a cross-section corresponding to those of the grooves.

The cross-section of the protrusion 18 may be of any shape, such rectangular or semi-circular, provided good sealing can be obtained. However, it has been found that one consisting of a rectangle 19 connected by a converged trapezoid 20 to the base surface 21 of the packing ring 17 is the most preferable. This is because a space 22 created between the converged trapezoid 20 and the inner wall of the groove 16 can accommodate the expanded portion of the packing ring 17 caused by deformation when the ring 17 is pressed into the groove 16 by the threading engagement of the cap 2 with the valve body 1, whereby a further tight seal can be achieved. Of course, another protrusion may be provided on the oppsite side of the packing ring for use of the seal of the type shown in FIG. 3.

As stated above, according to the present invention, there is no gap between the opposed end surfaces of the valve body 1 and of the body cap 2, which gap often occurs in a conventional valve, whereby the above problems can be eliminated.

We claim:

1. A diaphragm valve comprising a valve body having an upstream and a downstream end, a body cap on each said upstream and downstream end, piping on each said end, a diaphragm means for controlling a rate of liquid flow through the valve located intermediate each said end and means for providing a water-tight seal between said valve body and said body caps comprising an annular groove recessed in an end surface of each end of one of said valve body and a body cap, and packing rings each having an annular base with an annular protrusion on a surface of said annular base fitting into each of said annular grooves; each said protrusion having a cross-sectional configuration in the shape of a rectangle connected by a converging trapezoid to said base surface, and each said packing ring having an inner diameter equal to the inner diameter of said valve body.

2. A diaphragm valve according to claim 1, wherein said valve body is mainly made of polyvinyl chloride.

3. A diaphragm valve according to claim 1, wherein said annular groove is recessed on the respective end surface of said valve body.

4. A diaphragm valve according to claim 1, wherein said annular groove is recessed on an end surface of said body cap.

* * * * *